(12) United States Patent
Ramaiah et al.

(10) Patent No.: US 12,596,850 B2
(45) Date of Patent: Apr. 7, 2026

(54) SYSTEMS AND METHODS FOR GENERATING TRUST SCORES AND RELATED RECOMMENDATIONS USING SPDM-ENABLED DEVICES

(71) Applicant: Dell Products, L.P., Round Rock, TX (US)

(72) Inventors: Dharma Bhushan Ramaiah, Bangalore (IN); Vineeth Radhakrishnan, Palakkad (IN); Mini Thottunkal Thankappan, Bangalore (IN); Shinose Abdul Rahiman, Bangalore (IN); Rama Rao Bisa, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 286 days.

(21) Appl. No.: 18/177,145

(22) Filed: Mar. 2, 2023

(65) Prior Publication Data

US 2024/0296256 A1 Sep. 5, 2024

(51) Int. Cl.
*G06F 21/85* (2013.01)
*G06F 21/57* (2013.01)

(52) U.S. Cl.
CPC .............. *G06F 21/85* (2013.01); *G06F 21/57* (2013.01)

(58) Field of Classification Search
CPC .................................. G06F 21/85; G06F 21/57
See application file for complete search history.

(56) References Cited

U.S. PATENT DOCUMENTS

| | | | | |
|---|---|---|---|---|
| 8,806,575 | B2 * | 8/2014 | Bank ...................... | G06Q 90/00 726/3 |
| 11,838,874 | B2 * | 12/2023 | Xu ....................... | H04W 52/242 |
| 11,936,525 | B2 * | 3/2024 | Kunz ...................... | H04W 4/40 |
| 2017/0300716 | A1 * | 10/2017 | Reisgies ............... | G06F 21/606 |
| 2021/0117563 | A1 * | 4/2021 | Moresmau .......... | G06F 21/6218 |
| 2021/0243208 | A1 * | 8/2021 | Rubin ................... | G06F 21/552 |
| 2022/0058267 | A1 * | 2/2022 | Chow .................... | G06F 21/57 |
| 2023/0289433 | A1 * | 9/2023 | Kakaiya ................ | G06F 21/74 |
| 2024/0250812 | A1 * | 7/2024 | Miel ...................... | H04L 9/0863 |
| 2024/0259375 | A1 * | 8/2024 | Mitani ................... | H04L 63/20 |
| 2024/0281541 | A1 * | 8/2024 | Kazato .................. | H04L 63/105 |
| 2024/0311515 | A1 * | 9/2024 | Goodman ............... | G06F 21/64 |
| 2025/0139305 | A1 * | 5/2025 | Sahita .................... | G06F 21/85 |

* cited by examiner

*Primary Examiner* — Viral S Lakhia
(74) *Attorney, Agent, or Firm* — Fogarty LLP

(57) ABSTRACT

According to embodiments of the present disclosure, trust scores and related recommendations may be generated for an Information Handling System (IHS) with multiple Security Protocol and Data Model (SPDM)-enabled devices. The trust scores and recommendations may be provided by computer-executable instructions that, when executed by a processor, receive a plurality of trust-based data elements from a plurality of Security Protocol and Data Model (SPDM)-enabled devices conforming to a SPDM specification, and derive an overall trust based score for the IHS based upon the received trust-based data elements. The SPDM-enabled devices are configured in a computing device. The trust-based data element are associated with a plurality of SPDM-based measurements performed on the SPDM-enabled devices.

12 Claims, 5 Drawing Sheets

100

102
CPU

104

110 GIGABIT ETHERNET

112 ON-BOARD GRAPHICS

NORTH BRIDGE

114 MAIN MEMORY

106

108

116 USB PORTS

118 GPIO PINS

120 SERIAL ATA PORTS

122 ATA100 PORTS

124 SOUND ADAPTER

SOUTH BRIDGE

126 POWER MANAGEMENT

128 CLOCK GENERATION

PCIe BUS

130 PCIE SLOT

132 BMC

134 ETHERNET CONTROLLER

136 BIOS FIRMWARE

137 VIRTUAL NVRAM
SSD/NVMe

138 SUPER I/O DEVICE

140 SPI NATIVE NVRAM

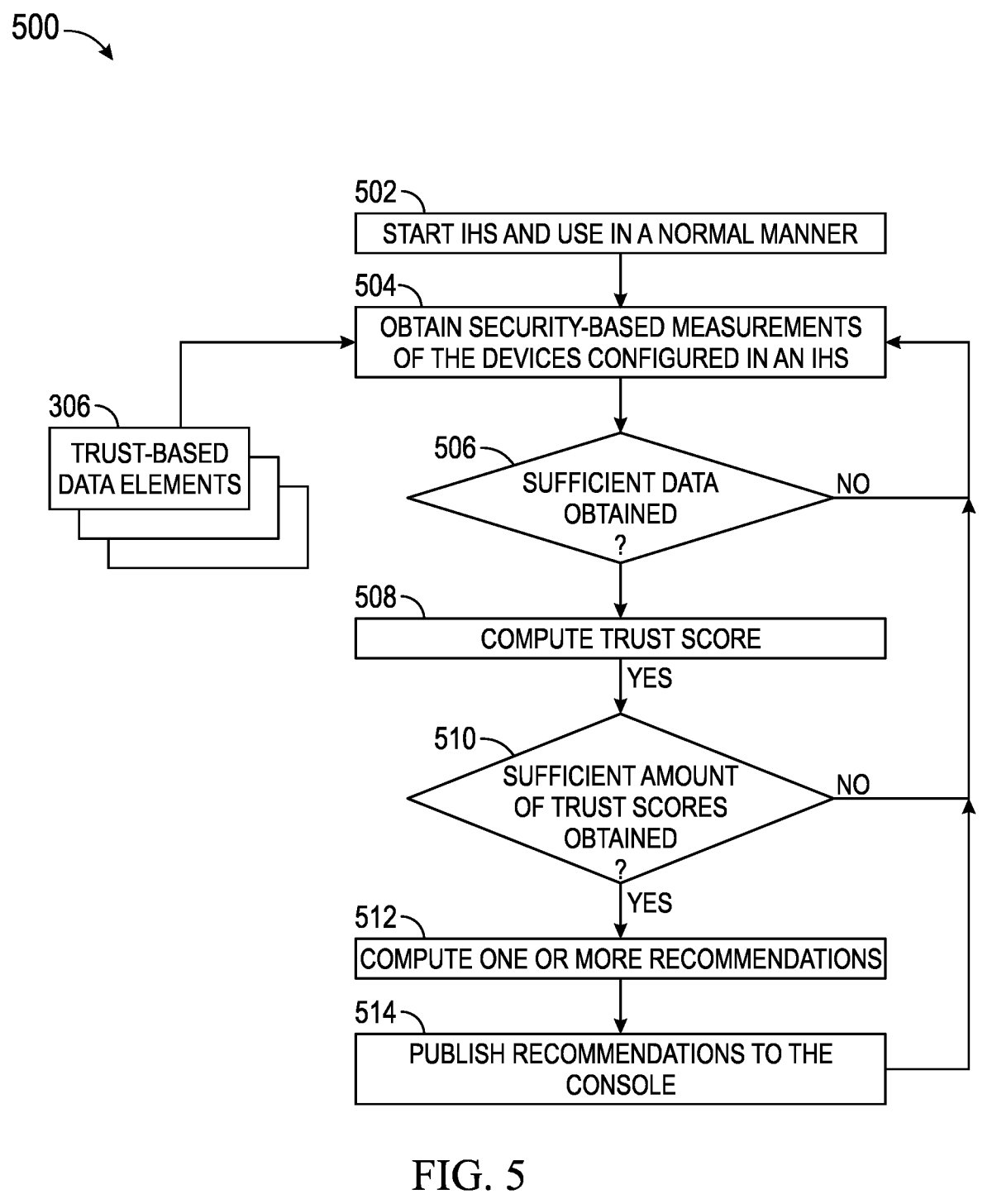

500

502
START IHS AND USE IN A NORMAL MANNER

504
OBTAIN SECURITY-BASED MEASUREMENTS OF THE DEVICES CONFIGURED IN AN IHS

306
TRUST-BASED DATA ELEMENTS

506
SUFFICIENT DATA OBTAINED ?          NO

508
COMPUTE TRUST SCORE

YES

510
SUFFICIENT AMOUNT OF TRUST SCORES OBTAINED ?          NO

YES

512
COMPUTE ONE OR MORE RECOMMENDATIONS

514
PUBLISH RECOMMENDATIONS TO THE CONSOLE

FIG. 5

SYSTEMS AND METHODS FOR GENERATING TRUST SCORES AND RELATED RECOMMENDATIONS USING SPDM-ENABLED DEVICES

BACKGROUND

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

Communication networks, and in particular the Internet, has revolutionized the manner in which software is updated on a computer system. Prior to the advent of the Internet, a software provider would package the update on computer readable media, and the computer owner had to obtain a copy of the media to complete the update in order to make the software update accessible to the user of the computer system. However, distributing software updates on computer readable media was often expensive for software providers, which tended to restrict the number of software updates that a software provider would issue. As a consequence, substantial time would pass between updates, and consumers had to manage certain known issues for these time periods, at least until an update became available. Another aspect of this older method was that many modifications were packaged into a single update to reduce the costs associated with distributing the update.

SPDM-based attestation, which has been published by the Platform Management Components Intercommunication (PMCI) Working Group of the Distributed Management Task Force (DMTF), generally involves a security mechanism to remotely detect an adversarial presence on a device to guarantee the device's trustworthiness. Attestation runs as a two-party security scheme in which a trusted party (e.g., the requesting device) assures the integrity of the untrusted remote device (e.g., the responding device). A requesting device, using this scheme, can determine the identity of a device and/or the firmware/software that the device is running. The responding device may send proof about its current state using a cryptographic hash to the requesting device. The requesting device may then evaluate the received evidence with the expected legitimate state of the responding device, and validate whether or not the responding device is trustworthy or not. Many system-on-chip (SOC) platforms now use SPDM-based attestation due in large part, to its light weight and high levels of security provided thereby.

SUMMARY

According to embodiments of the present disclosure, trust scores and related recommendations may be generated for an Information Handling System (IHS) with multiple Security Protocol and Data Model (SPDM)-enabled devices. The trust scores and recommendations may be provided by computer-executable instructions that, when executed by a processor, receive a plurality of trust-based data elements from a plurality of Security Protocol and Data Model (SPDM)-enabled devices conforming to a SPDM specification, and derive an overall trust based score for the IHS based upon the received trust-based data elements. The SPDM-enabled devices are configured in a computing device. The trust-based data element are associated with a plurality of SPDM-based measurements performed on the SPDM-enabled devices.

According to another embodiment, a trust-based score and recommendation generating method includes the steps of receiving a plurality of trust-based data elements from a plurality of SPDM-enabled devices configured in a computing device, and deriving an overall trust based score for an Information Handling System (HIS) based upon the received trust-based data elements. The trust-based data element are associated with a plurality of SPDM-based measurements performed on the SPDM-enabled devices.

According to yet another embodiment, a computer program product includes computer-executable instructions to receive an attestation request from a requesting device, receive a plurality of trust-based data elements from a plurality of SPDM-enabled devices, and derive an overall trust based score for the IHS based upon the received trust-based data elements. The trust-based data elements are associated with multiple SPDM-based measurements performed on the SPDM-enabled devices.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

FIG. 5 illustrates an example trust-based score and recommendation generating method that may be performed to generate trust scores for an IHS and generate recommendations for improving the trust score over time according to one embodiment of the present disclosure.

DETAILED DESCRIPTION

Figure 1:
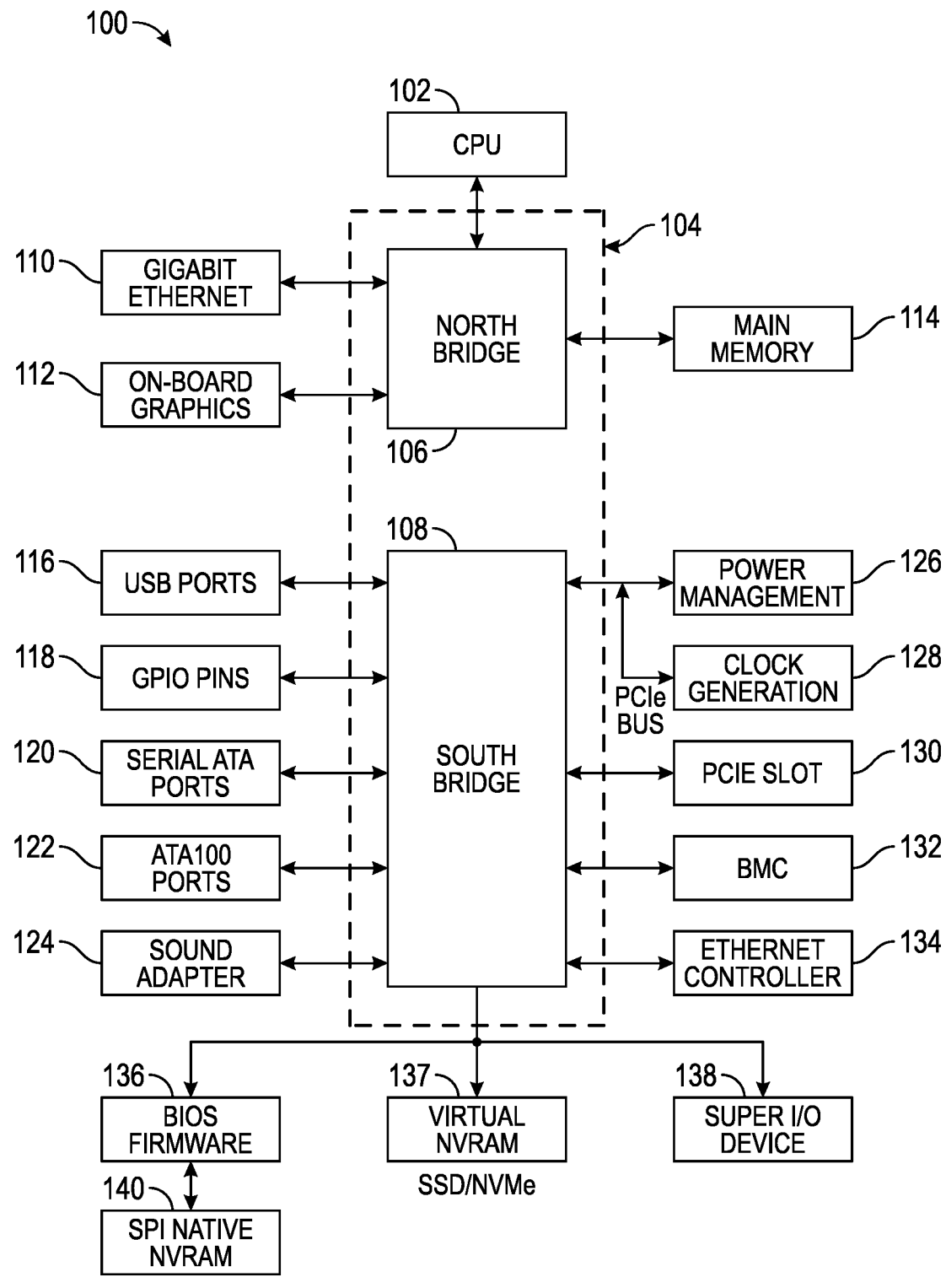
FIG. 1 shows an example of an Information Handling System (IHS) that may be configured to implement a system and method for collective attestation according to one embodiment of the present disclosure.

The present disclosure is described with reference to the attached figures. The figures are not drawn to scale, and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below.

Certain IHSs may be configured with BMCs that are used to monitor, and in some cases manage computer hardware components of their respective IHSs. A BMC is normally programmed using a firmware stack that configures the BMC for performing out-of-band (e.g., external to a computer's operating system or BIOS) hardware management tasks. The BMC firmware can support industry-standard Specifications, such as the Intelligent Platform Management Interface (IPMI) and Systems Management Architecture of Server Hardware (SMASH) for computer system administration.

Baseboard management controllers (BMCs) are particularly well suited for the features provided by the Security Protocol and Data Model (SPDM) specification. The SPDM specification has been published by the Platform Management Components Intercommunication (PMCI) Working Group of the Distributed Management Task Force (DMTF). A particular goal of the SPDM specification is to facilitate secure communication among the devices of a platform management subsystem. Examples of a platform management subsystem may include an Information Handling System (IHS), such as a desktop computer, laptop computer, a cellular telephone, a server, and the like.

The SPDM specification defines messages and procedures for secure communication among hardware devices, which includes authentication of hardware devices and session key exchange protocols to provide secure communication among those hardware devices. Management Component Transport Protocol (MCTP) Peripheral Component Interconnect Express (PCIe) vendor defined message (VDM) channels, which supports peer-to-peer messaging (e.g., route by ID), allow a SPDM-enabled hardware device to issue commands to other SPDM-enabled hardware devices within a secure communication channel.

Cyber attackers are reportedly exploiting and abusing devices, such as platform interface protocol analyzers to steal unencrypted information, spy on network traffic, and gather information to leverage in future attacks against platform components and component interfaces (e.g., I2C, PCIe, I3C, Sensewire, SPI, etc.) of an IHS. Detection of vulnerable platform components is not an easy task, and exploiting unpatched vulnerabilities could allow the attacker to take control of the IHS. Some example platform security risks may include compromised security in which hostile component insertion and/or compromised firmware updates can cause supply chain security issues. Another example platform security risk may include confidentiality and integrity risks in which data transfers that are unencrypted may be vulnerable to eavesdropping, stealing, and tampering. Additionally, non-compliant security configuration errors, certificate management, platform security trust, and the like could lead to non-compliance with industry standard security policies. The DMTF SPDM specifications have been developed to alleviate such problems and reduce management overhead in maintaining and establishing the platform security within the IHS infrastructure domain.

Devices enabled by SPDM support are having higher trust compared to devices without SPDM support, as they provide cryptographic guarantees for the device identity and the firmware. In a datacenter cluster, understanding how secure the system is may provide a benefit by providing quantitative parameters to help to understand the risk factors. Nevertheless, currently there exists no technique to inform users which systems are secured and which are not in real-time. This may result in the users unknowingly using unsecured components/servers in their datacenter. Quantitative and qualitative scores for a trust factor on compute node enables the user to gauge the risk and perform appropriate corrective actions, such as updating their servers and/or the devices configured in those servers accordingly.

As described previously, SPDM provides a way to attest the devices in the server in a manner that establishes the security and integrity of each server. In multiple clusters, the status is expected to be uniform in terms of health of the system and with respect to a security footprint. Indications of vast differences in security status among clusters and among servers could be an indication that the system needs one or more updates. These differences could also be a pointer to a potential indication of compromise.

As will be described in detail herein below, embodiments of the present disclosure provide a system and method for generating trust-based scores for a server, or collectively for a cluster of servers (e.g., data center) by receiving a plurality of trust-based data elements from the devices configured in the server(s), and deriving an overall trust based score for the IHS based upon the received trust-based data elements. Additionally, embodiments may include a system and method that recommends certain remedial actions to improve the trust-based score.

FIG. 1 shows an example of an IHS 100 that may be configured to implement embodiments described herein. It should be appreciated that although certain embodiments described herein may be discussed in the context of a desktop or server computer, other embodiments may be utilized with virtually any type of IHS 100. Particularly, the IHS 100 includes a baseboard or motherboard, to which is a printed circuit board (PCB) to which components or devices are mounted by way of a bus or other electrical communication path. For example, Central Processing Unit (CPU) 102 operates in conjunction with a chipset 104. CPU 102 is a processor that performs arithmetic and logic necessary for the operation of the IHS 100.

Chipset 104 includes northbridge 106 and southbridge 108. Northbridge 106 provides an interface between CPU 102 and the remainder of the IHS 100. Northbridge 106 also provides an interface to a random access memory (RAM) used as main memory 114 in the IHS 100 and, possibly, to on-board graphics adapter 112. Northbridge 106 may also be configured to provide networking operations through Ethernet adapter 110. Ethernet adapter 110 is capable of connecting the IHS 100 to another IHS (e.g., a remotely located IHS 100) via a network. Connections which may be made by Ethernet adapter 110 may include local area network (LAN) or wide area network (WAN) connections. Northbridge 106 is also coupled to southbridge 108.

Southbridge 108 is responsible for controlling many of the input/output (I/O) operations of the IHS 100. In particular, southbridge 108 may provide one or more universal serial bus (USB) ports 116, sound adapter 124, Ethernet controller 134, and one or more general purpose input/output (GPIO) pins 118. Southbridge 108 may also provide a bus for interfacing peripheral card devices such as PCIe slot 130. In some embodiments, the bus may include a peripheral component interconnect (PCI) bus. Southbridge 108 may also provide baseboard management controller (BMC) 132 for use in managing the various components of the IHS 100. Power management circuitry 126 and clock generation circuitry 128 may also be utilized during operation of southbridge 108.

Additionally, southbridge 108 is configured to provide one or more interfaces for connecting mass storage devices to the IHS 100. For instance, in an embodiment, southbridge 108 may include a serial advanced technology attachment (SATA) adapter for providing one or more serial ATA ports 120 and/or an ATA100 adapter for providing one or more ATA100 ports 122. Serial ATA ports 120 and ATA100 ports 122 may be, in turn, connected to one or more mass storage devices storing an operating system (OS) and application programs.

An OS may comprise a set of programs that controls operations of the IHS 100 and allocation of resources. An application program is software that runs on top of the OS and uses computer resources made available through the OS to perform application-specific tasks desired by the user.

Mass storage devices connected to southbridge 108 and PCIe slot 130, and their associated computer-readable media provide non-volatile storage for the IHS 100. Although the description of computer-readable media contained herein refers to a mass storage device, such as a hard disk or CD-ROM drive, it should be appreciated by a person of ordinary skill in the art that computer-readable media can be any available media on any memory storage device that can be accessed by the IHS 100. Examples of memory storage devices include, but are not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices.

A low pin count (LPC) interface may also be provided by southbridge 108 for connecting Super I/O device 138. Super I/O device 138 is responsible for providing a number of I/O ports, including a keyboard port, a mouse port, a serial interface, a parallel port, and other types of input/output ports.

The LPC interface may connect a computer storage media such as a ROM or a flash memory such as a non-volatile random access memory (NVRAM) for storing BIOS/firmware 136 that includes BIOS program code containing the basic routines that help to start up the IHS 100 and to transfer information between elements within the IHS 100. BIOS/ firmware 136 comprises firmware compatible with the Extensible Firmware Interface (EFI) Specification and Framework.

The LPC interface may also be utilized to connect virtual NVRAM 137 (e.g., SSD/NVMe) to the IHS 100. The virtual NVRAM 137 may be utilized by BIOS/firmware 136 to store configuration data for the IHS 100. In other embodiments, configuration data for the IHS 100 may be stored on the same virtual NVRAM 137 as BIOS/firmware 136. The IHS 100 may also include a SPI native NVRAM 140 coupled to the BIOS 136.

BMC 132 may include non-volatile memory having program instructions stored thereon that enable remote management of the IHS 100. For example, BMC 132 may enable a user to discover, configure, and manage the IHS 100, setup configuration options, resolve and administer hardware or software problems, etc. Additionally or alternatively, BMC 132 may include one or more firmware volumes, each volume having one or more firmware files used by the BIOS' firmware interface to initialize and test components of the IHS 100.

As a non-limiting example of BMC 132, the integrated DELL Remote Access Controller (iDRAC) from DELL, INC. is embedded within DELL POWEREDGE servers and provides functionality that helps information technology (IT) administrators deploy, update, monitor, and maintain servers with no need for any additional software to be installed. The iDRAC works regardless of OS or hypervisor presence from a pre-OS or bare-metal state because iDRAC is embedded within the IHS 100 from the factory.

It should be appreciated that, in other embodiments, the IHS 100 may comprise other types of computing devices, including hand-held computers, embedded computer systems, personal digital assistants, and other types of computing devices. It is also contemplated that the IHS 100 may not include all of the components shown in FIG. 1, may include other components that are not explicitly shown in FIG. 1, or may utilize a different architecture.

According to embodiments of the present disclosure, the IHS 100 may support SPDM in which the BMC 132 manages the operation of one or more managed devices configured in the IHS 100. The SPDM specification provides for secure communication between the BMC 132 and the managed devices in the IHS 100. To meet this goal, the SPDM specification facilitates certificate chains that are stored in up to eight slots. Slot 0 is a default slot that is always used, while the other slots (e.g., slots 1-7) may be allocated for use by the administrator of the IHS 100. The SPDM spec also provides a slot mask that identifies each certificate chain.

Figure 2:
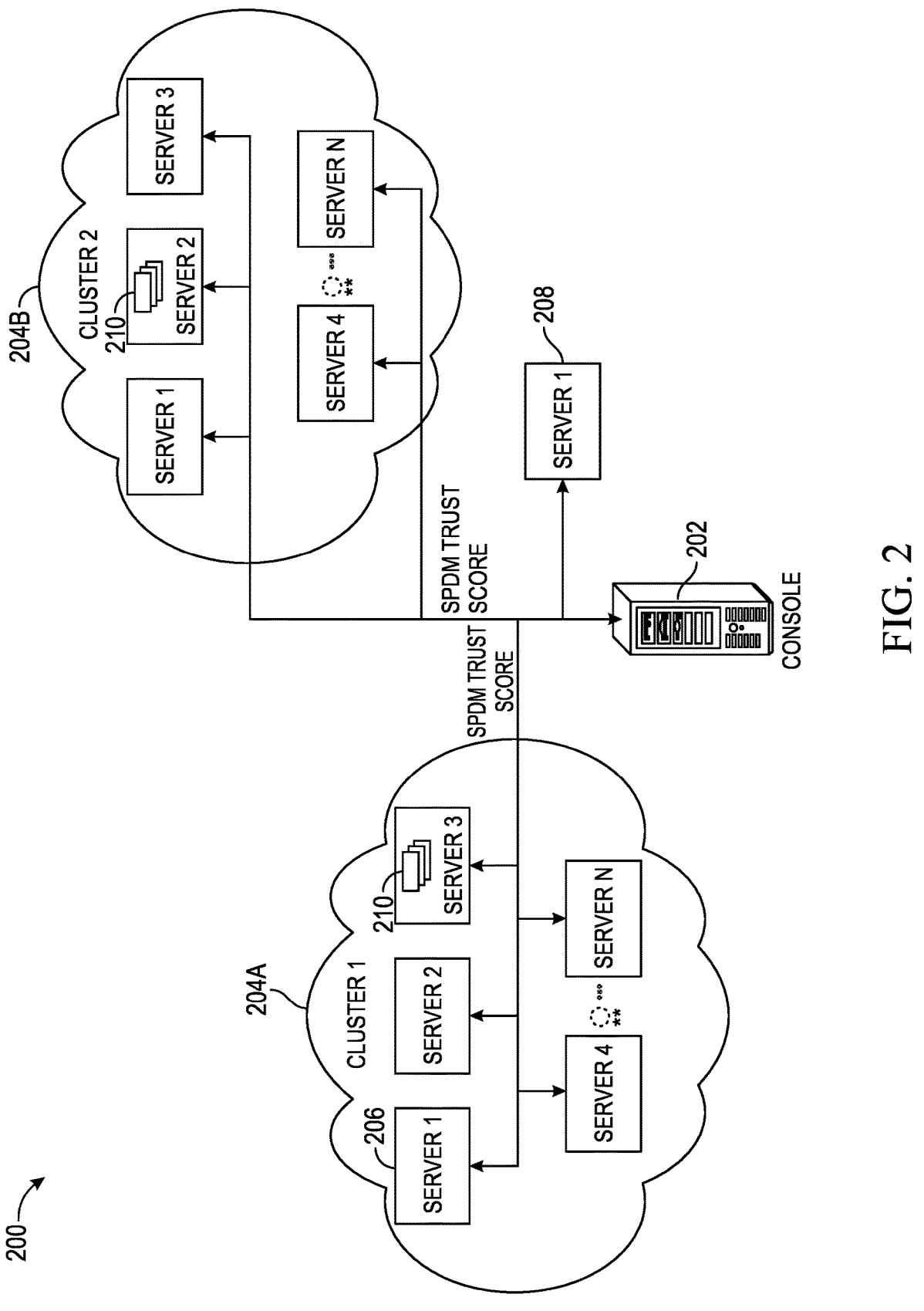
FIG. 2 illustrates an example, trust-based score and recommendation generating system according to one embodiment of the present disclosure.

FIG. 2 illustrates an example, trust-based score and recommendation generating system 200 according to one embodiment of the present disclosure. The trust-based score and recommendation generating system 200 includes a console 202 that is configured to manage the operations of one or more clusters 204a-b (collectively 204), and the individual servers 206 configured in those clusters 204. As will be described in detail herein below, the console 202 communicates with an IHS 100 that receives a plurality of trust-based data elements from one or more SPDM-enabled devices 210 configured in each server 206, and derives an overall trust based score for the IHS based upon the received trust-based data elements. Over time, the IHS 100 may also generate recommendations for performing remedial actions to improve the trust-based score over time.

The console 202, trust-based score and recommendation generating server 208, and servers 204 may each be or comprise at least a portion of the IHS 100 described above with reference to FIG. 1. Additionally, the console 202 and trust-based score generating and recommendation server 208 as shown communicates with, and manages the operation of two clusters 204*a-b*. Nevertheless, it should be appreciated that the console 202 and trust-based score and recommendation generating server 208 may be configured to communicate with, and manage any number of clusters. Additionally, it should be appreciated that the console 202 and trust-based score and recommendation generating server 208 may be configured to manage individual servers 206 configured in clusters 204 in addition to other servers 206 that are not configured in any particular cluster 204.

The console 202 may be any type that manages the operation of the clusters 204 and the servers 206 configured in the clusters 204. For example, console 202 may include a systems management appliance such as the Dell EMC OpenManage Enterprise (OME) systems manager that is installed on a secure virtual machine (VM), such as a VMWARE Workstation. Additionally, the console 202 may be configured locally to the clusters 204 (e.g., housed in the same building as the clusters 204), or remotely over a communication network, such as the Internet.

Figure 3:
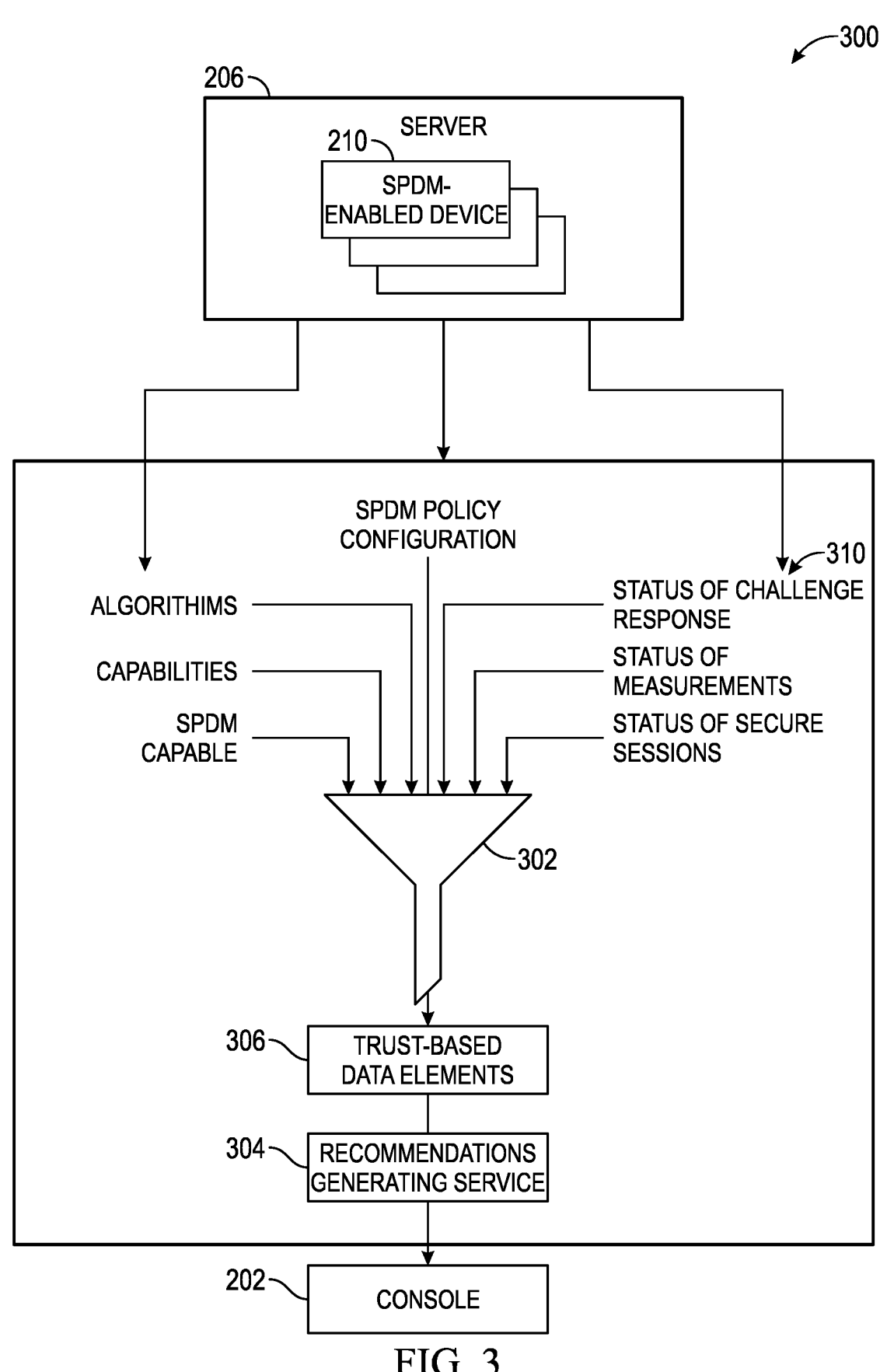
FIG. 3 illustrates a detailed view of several components of the trust-based score and recommendation generating system according to one embodiment of the present disclosure.

FIG. 3 illustrates a detailed view of several components of the trust-based score and recommendation generating system 200 according to one embodiment of the present disclosure. As shown, the trust-based score and recommendation generating server 208 stores and executes trust-based scoring tool 302 and a recommendations generating service 304. The trust-based scoring tool 302 receives trust-based data elements 306*a-n* (collectively 306) from the SPDM-enabled devices 210 of each or certain SPDM-enabled devices 210 based on SPDM-based measurements conducted on those SPDM-enabled devices 210, and generates a trust score according to the received trust-based data elements 306. In one embodiment, the trust-based scoring tool 302 may generate the trust score for a single server 206, generate a trust score for a portion of the servers 206 in a cluster 204, or generate an overall trust score for all of the servers 206 in a cluster 204.

SPDM-enabled devices 210, which may be configured in each server 206, may conform to the SPDM specification. Examples of SPDM-enabled devices 210 may include any SPDM-enabled device, such as on-board graphics adapter 112, Ethernet adapter 110, USB ports 116, sound adapter 124, Ethernet controller 134, GPIO pins 118, PCIe slot 130, Power management circuitry 126, clock generation circuitry 128, serial ATA ports 120, ATA100 ports 122, virtual NVRAM 137, SPI native NVRAM 140, and Super I/O device 138 as described herein above. SPDM is particularly useful in that it provides a chain of trust originating from a root source so that each SPDM-enabled device 210 when validated, may provide a level of trust with a high degree of confidence that is limited only by the trust level of the root source, also referred to as a Certificate Authority (CA). SPDM also provides for measurements 310 that may affect the level of trust, or in the alternative, be affected by the trust level of its respective server 206. Examples of measurements 310 that may be provide by SPDM include an SPDM Policy configuration, whether or not a particular device is SPDM enabled or not, SPDM capabilities of the SPDM-enabled device, algorithms supported by the SPDM-enabled device, a status of a challenge response received from a SPDM-enabled device, a status of a measurement obtained from a SPDM-enabled device, and a status of a secure session established with the SPDM-enabled device.

Each of these measurements may generate a trust-based data element that indicates at least one aspect associated with the trust level of the SPDM-enabled device 210. For example, one trust-based data element may indicate that a particular SPDM-enabled device 210 is running a particular version of firmware, and the trust-based scoring tool 302 possessing knowledge of the fact that the version of firmware is outdated, may downgrade the trust score for that server 206. For another example, another trust-based data element may, according to supported algorithms measurements, may cause the trust-based scoring tool 302 to determine that a SPDM-enabled device 210 supporting AES-256 encryption capabilities shall be scored higher than another SPDM-enabled device 210 that only supports AES-128 encryption. For yet another example, another trust-based data element indicating that a SPDM-enabled device 210 supports signed measurements may be determined by the trust-based scoring tool 302 to score the SPDM-enabled device 210 higher than a device supporting only unsigned measurements.

According to one embodiment, the trust-based scoring tool 302 may apply weights to each trust-based data element so that the trust score optimally reflects the effective trust of a SPDM-enabled device 210 or cluster 204. For example, it may be determined that a particular version of firmware executed on a particular SPDM-enabled device 210 has caused security breaches in the past, so therefore, the trust-based scoring tool 302 may increase a weighting to the trust-based data element including the version information so that the resulting trust score accurately reflects the vulnerability of the SPDM-enabled device 210 in an optimal manner.

In one embodiment, the trust-based scoring tool 302 may include a machine learning (ML) process such as, for example, a Bayesian algorithm, a Linear Regression algorithm, a Decision Tree algorithm, a Random Forest algorithm, a Neural Network algorithm, or the like. The ML algorithm, in general, receives trust-based data elements, such as that described herein above, and evaluates the information against a trained ML model to obtain profile recommendations about any security threats about certain measurements. Using the profile recommendations, the ML algorithm may increase the weightings applied to certain trust-based data elements, while lowering other weightings applied to other trust-based data elements based upon the past severity of the vulnerabilities caused by those trust-based data elements.

A user (e.g., administrator) can fetch the trust score using any existing interface, such as one provided by the console 202. Optionally if the trust score is below par, a BMC 132 configured in the affected server 206 can disable all in-band communications by communicating with host drivers (e.g., iDRAC Service Module (iSM)) running on an OS of that server 206. Additionally, the BMC 132 may communicate with the host OS using a plug-in inserted in iSM so that it can report the abnormally low trust score to the user.

The service 304 is provided to generate recommendations that may be used to improve the trust score of any server 206 or cluster 204 of servers 206. For example, the service 304 may process multiple trust scores that have been received over a period of time at ongoing intervals (e.g., periodically) to infer certain actions (e.g., recommendations) that may be performed either manually (e.g., by a user of the server 206 or cluster 204), or automatically (e.g., by a process running on the server 206, cluster 204, console 202, and/or trust-based score and recommendation generating server 208) to improve trust scores that may be obtained in the future.

Recommendations that may be generated by the service 304 may include, for example, recommendations for the user to update the firmware of certain types of SPDM-enabled devices 210, recommendations to strengthen the security configuration or investigate a potential security issue, recommendations to remove or add certain communication links to the server 206 or cluster 204 to name a few.

While the service 304 is shown and described as being executed in the trust-based score and recommendation generating server 208, in other embodiments, the service 304 may be executed on any suitable platform, such as by the console 202 running Openmanage Enterprise.

Figure 4A:
FIGS. 4A and 4B are graphs illustrating trust scores that may be obtained from a server or cluster over time according to one embodiment of the present disclosure.
Figure 4A:
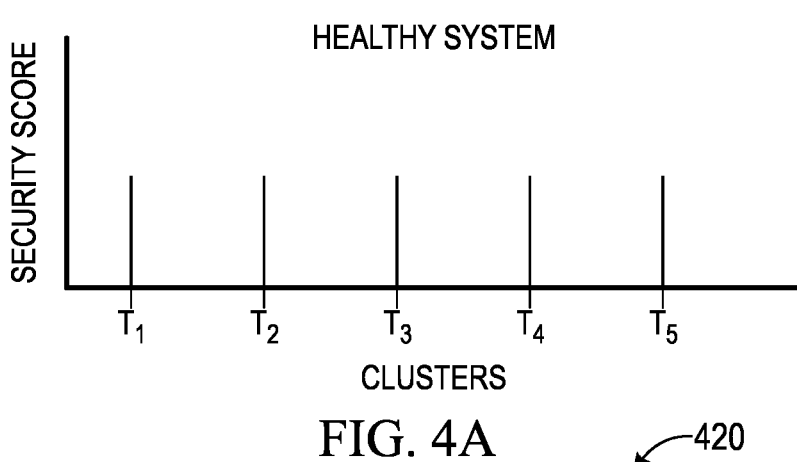
Figure 4B:
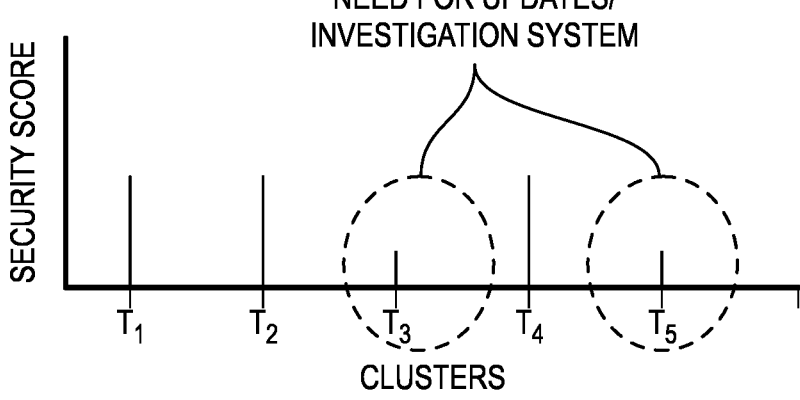

FIGS. 4A and 4B are graphs 400, 420 illustrating trust scores that may be obtained from a server 206 or cluster 204 over time. In particular, the graph 400 of FIG. 4A illustrates trust scores of a server 206 or cluster 204 that is relatively healthy. That is, if the server 206 or cluster 204 is in a healthy security state, the trust scores are expected to be consistent. The lack of consistency may indicate, for example, missing firmware updates, insecure configurations, and/or potential compromise. The graph 420 of FIG. 4B, on the other hand, is not in a healthy security state because, among other things, the trust score obtained at t3 and t5 are abnormally low.

According to embodiments of the present disclosure, the recommendation generating service 304 may process the trust scores obtained from a server 206 or cluster 204 to generate the recommendations according to any type of criteria. For example, the recommendation generating service 304 may determine that variations in magnitude (e.g., fluctuations) of the trust scores over time, such as shown above with reference to FIG. 4B, may be an indication that certain actions should be performed on the server 206 or cluster 204 and generate a recommendation. The recommendation generating service 304 may use other criteria. For example, the recommendation generating service 304 may determine, such as according to a ML process, that low trust scores were obtained on or about the same time in which firmware updates to certain SPDM-enabled devices 210 were deployed. In such a case, the recommendation generating service 304 may infer that the SPDM-enabled device 210 is causing certain security vulnerabilities and issue a recommendation to the user that the SPDM-enabled devices 210 should be replaced with other SPDM-enabled devices 210 having an improved security posture.

FIG. 5 illustrates an example trust-based score and recommendation generating method 500 that may be performed to generate trust scores for an IHS 100 and generate recommendations for improving the trust score over time according to one embodiment of the present disclosure. The IHS 100 may be a server 206 or cluster 204 such as described above. Additionally or alternatively, the trust-based score and recommendation generating method 500 may be performed at least in part, by the trust-based score and recommendation generating system 300 as described herein above with reference to FIGS. 2 and 3. The trust-based score and recommendation generating method 500 may be performed at any suitable time, such as continually or at an ongoing basis (e.g., periodically) to generate trust scores for a server 206 or cluster 204 and generate recommendations based upon the trust scores obtained over time.

At step 502, the IHS 100 is started and used in a normal manner. During its normal use, the trust-based scoring tool 302 may collect data associated with security related features of the SPDM-enabled devices 210 configured in the IHS 100 at step 504. In one embodiment, the method 500 may perform SPDM-based measurements on the SPDM-enabled device 210 to extract the security related features. The SPDM-based measurements may include, for example, SPDM Policy configuration, whether or not a particular device is SPDM enabled or not, SPDM capabilities of the SPDM-enabled device, algorithms supported by the SPDM-enabled device, a status of a challenge response received from a SPDM-enabled device, a status of a measurement obtained from a SPDM-enabled device, and a status of a secure session established with the SPDM-enabled device. In another embodiment, each of the SPDM-enabled devices 210 may be attested prior to obtained measurement from them to ensure the integrity of the data obtained.

In another embodiment, the trust-based scoring tool 302 may perform a ML process over multiple trust-based data elements obtained from the measurements to infer the trust score. For example, the trust-based scoring tool 302 may collect trust-based data elements every 30 minutes at an ongoing basis over a period of time, such as a few days to a few weeks, until sufficient data may be obtained in which one or more security-based features of the resources of the IHS 100 may be derived.

At step 506, the trust-based score and recommendation generating method 500 (e.g., via the trust-based scoring tool 302) determines whether sufficient amount of trust-based data elements exist to compute a trust score. If not, processing continues at step 504 in which the trust-based scoring tool 302 continues receiving and logging trust-based data elements; otherwise, processing continues at step 508 in which the trust-based scoring tool 302 computes a trust score for the IHS 100. In one embodiment, the method 500 may generate a message to the console 202 indicating the score 306 for consumption by the user. In another embodiment, the method 500 may compare the trust score against a lower threshold value and generate an alert message only when the computed trust score goes below the lower threshold value.

At step 510, the trust-based score and recommendation generating method 500 (e.g., via the recommendation generating service 304) determines whether a sufficient amount of trust scores have been generated. If not, processing continues at step 504 in which the trust-based scoring tool 302 continues receiving and logging trust-based data elements; otherwise, processing continues at step 512 in which the trust-based score generating trust-based scoring tool 302 computes one or more recommendations for the IHS 100. In one embodiment, the trust-based score and recommendation generating method 500 may generate the recommendations only when the most recently generated trust score has gone below the lower threshold value as described above. Thereafter at step 514, the trust-based score and recommendation generating method 500 publishes the recommendations for consumption by the user. For example, the trust-based score and recommendation generating method 500 may generate an alert message requesting that the user perform one or more actions on the IHS 100 to improve the security-based posture for the IHS 100.

The aforedescribed trust-based score and recommendation generating method 500 may be continually performed during operation of the IHS 100 for ongoing generation of trust scores for the IHS 100, and generation of recommendations for improving the security-based posture for the IHS 100. Nevertheless, when use of the trust score generation method 500 is no longer needed or desired, the method 500 ends.

Although FIG. 5 describes an example method 500 that may be performed to ensure the collective integrity of an IHS 100, the features of the method 500 may be embodied in other specific forms without deviating from the spirit and scope of the present disclosure. For example, the method 500 may perform additional, fewer, or different operations than those described in the present examples. For another example, the method 500 may be performed in a sequence of steps different from that described above. As yet another example, certain steps of the method 500 may be performed by other components than those described above.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," when used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS) comprising:
   at least one memory coupled to at least one processor, the at least one memory having program instructions stored thereon that, upon execution by the at least one processor, cause the instructions to:
   receive a plurality of trust-based data elements from a plurality of Security Protocol and Data Model (SPDM)-enabled devices conforming to a SPDM specification, wherein the SPDM-enabled devices are configured in a computing device, and wherein the trust-based data element are associated with a plurality of SPDM-based measurements performed on the SPDM-enabled devices; and
   derive an overall trust based score for the IHS based upon the received trust-based data elements;
   apply a plurality of weights to each of a plurality of types of the SPDM-based measurements; and
   determine that one or more recommendations are to be generated according to an excess fluctuation in a plurality of the generated trust scores over time.

2. The IHS of claim 1, wherein the program instructions, upon execution, further cause the IHS to attest each of the SPDM-enabled devices prior to performing the SPDM-based measurements.

3. The IHS of claim 1, wherein the types of the measurements comprises at least one of an SPDM Policy configuration, whether or not a particular device is SPDM enabled, SPDM capabilities of the SPDM-enabled device, algorithms supported by the SPDM-enabled device, a status of a challenge response received from a SPDM-enabled device, a status of a measurement obtained from a SPDM-enabled device, and a status of a secure session established with the SPDM-enabled device.

4. The IHS of claim 1, wherein the program instructions, upon execution, further cause IHS to determine the recommendations using a Machine Learning (ML) process.

5. The IHS of claim 1, wherein the program instructions, upon execution, further cause IHS to publish the recommendations to a console that manages the operation of the computing device.

6. The IHS of claim 1, wherein the computing device comprises at least one of a server and a cluster configured with a plurality of the servers.

7. A trust-based score and recommendation generating method comprising:
   receiving a plurality of trust-based data elements from a plurality of Security Protocol and Data Model (SPDM)-enabled devices conforming to a SPDM specification, wherein the SPDM-enabled devices are configured in a computing device, and wherein the trust-based data element are associated with a plurality of SPDM-based measurements performed on the SPDM-enabled devices;
   deriving an overall trust based score for an Information Handling System (HIS) based upon the received trust-based data elements;
   apply a plurality of weights to each of a plurality of types of the SPDM-based measurements; and
   determining that one or more recommendations are to be generated according to an excess fluctuation in a plurality of the generated trust scores over time.

8. The trust-based score and recommendation generating method of claim 7, further comprising attesting each of the SPDM-enabled devices prior to performing the SPDM-based measurements.

9. The trust-based score and recommendation generating method of claim 7, further comprising determining the recommendations using a Machine Learning (ML) process.

10. The trust-based score and recommendation generating method of claim 7, further comprising publishing the recommendations to a console that manages the operation of the computing device.

11. A computer program product comprising a non-transitory computer readable storage medium having program instructions stored thereon that, upon execution by an Information Handling System (IHS), cause the IHS to:

receive an attestation request from a requesting device;

receive a plurality of trust-based data elements from a plurality of Security Protocol and Data Model (SPDM)-enabled devices conforming to a SPDM specification, wherein the SPDM-enabled devices are configured in a computing device, and wherein the trust-based data element are associated with a plurality of SPDM-based measurements performed on the SPDM-enabled devices;

derive an overall trust based score for the IHS based upon the received trust-based data elements;

apply a plurality of weights to each of a plurality of types of the SPDM-based measurements; and determine that one or more recommendations are to be generated according to an excess fluctuation in a plurality of the generated trust scores over time.

12. The computer program product of claim 11, wherein the program instructions, upon execution, further cause IHS to determine the recommendations using a Machine Learning (ML) process.

\*  \*  \*  \*  \*